UNITED STATES PATENT OFFICE.

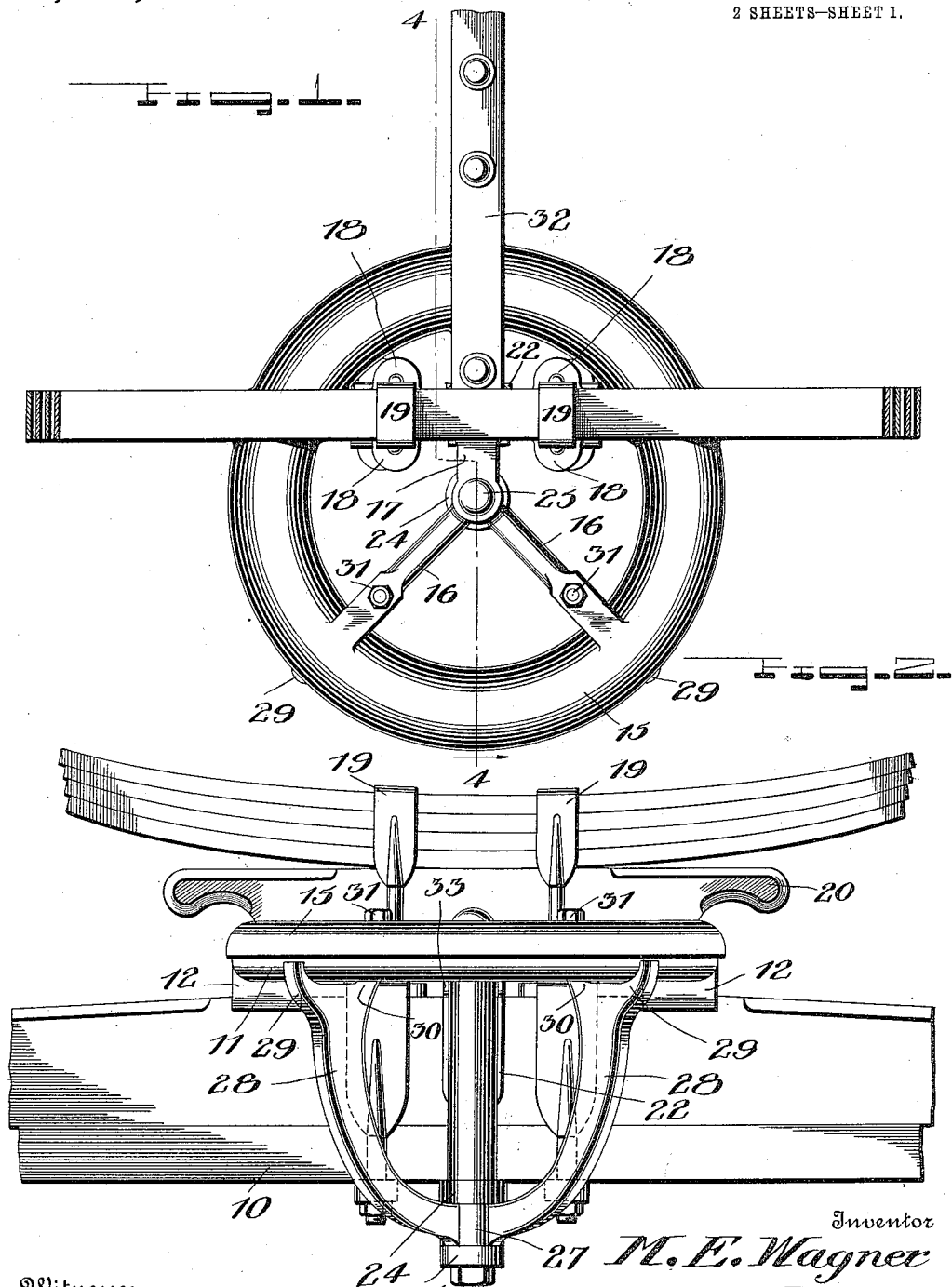

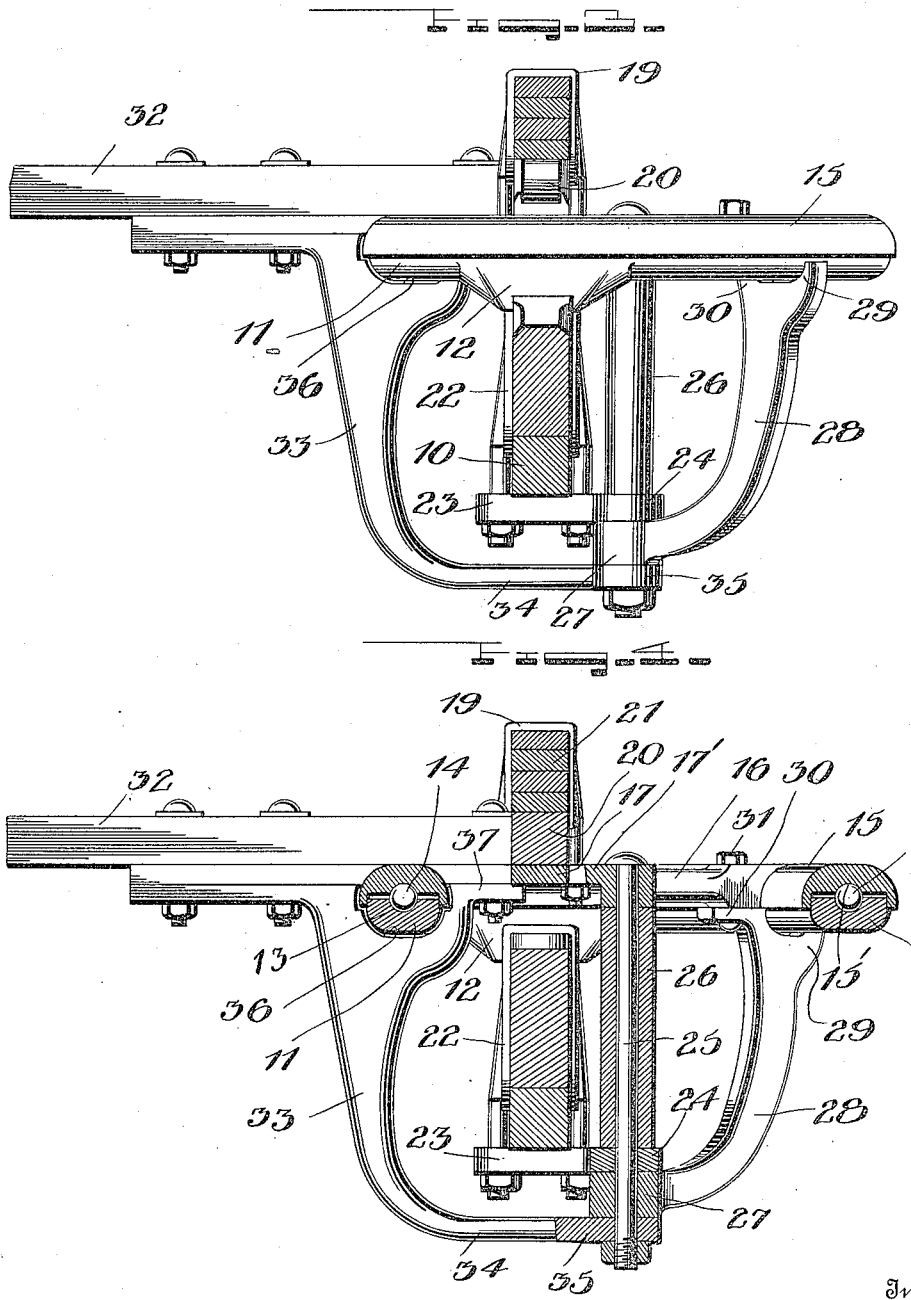

MYRON E. WAGNER, OF BRIDGEPORT, ILLINOIS.

FIFTH-WHEEL.

1,080,941.

Specification of Letters Patent.

Patented Dec. 9, 1913.

Application filed December 11, 1911. Serial No. 665,022.

*To all whom it may concern:*

Be it known that I, MYRON E. WAGNER, a citizen of the United States, residing at Bridgeport, in the county of Lawrence, State of Illinois, have invented certain new and useful Improvements in Fifth-Wheels; and I do hereby declare the following to be a full, clear, and exact description of the invention, such as will enable others skilled in the art to which it appertains to make and use the same.

This invention relates to improvements in wagons, and has particular reference to fifth wheels, therefor.

One object of the invention is to provide a novel construction of fifth wheels, having roller bearings therein, the parts being so constructed and arranged that they may be quickly and easily taken apart or assembled.

Another object of the invention is to provide a fifth wheel which is dust-proof, and which will be of such construction that the vehicle is more strongly supported than the former construction.

Other objects and advantages will be apparent from the following description and with particular reference to the accompanying drawings.

In the drawings: Figure 1 is a top plan view of my fifth wheel, Fig. 2 is a front elevation of the same, Fig. 3 is a side elevation, Fig. 4 is a section on the line 4—4 of Fig. 1.

Referring particularly to the drawings, 10 represents the front axle of a vehicle, having mounted thereon the circular track or lower member of the turn table 11, said track being mounted on the axle by means of the clip 12. This track is formed with a circular channel 13, in the upper side thereof, to receive a series of balls 14. Mounted on the track 11 is a similar track 15, having a ball race 15′ in its lower face to complete the channel for the balls 14. Both of these tracks are in the form of rings, the upper one 15 having the radial spokes 16 in the portion of the tracks in advance of the axle, said spokes being formed integral with the upper ring. Also formed integrally with the upper ring and in the rear portion thereof is a cross bar 17, which is connected to the inner ends of the spokes 16 by the connecting member 17′, said cross member having the oppositely extending perforated lugs 18 to receive the threaded ends of the straps 19 which clamp the bolster 20 and the spring 21 thereto.

Secured centrally to the axle by means of the strap 22 is a bracket 23, which has in its forward end a flattened and perforated head 24, the perforations in said head being formed vertically therethrough and adapted to receive a bolt 25 which passes through an opening in the inner ends of the spokes 16. A hub member 26 is mounted on the said bolt between the spokes 16 and the end of the bracket 23, providing a bearing for said bolt and a spacing member between the spokes and the bracket 23. Mounted below the bracket 23 is a hub 27, which has formed integrally therewith the two outwardly and upwardly radiating curved arms 28. The upper end of each of these arms 28 is provided with the fingers 29 and 30, a curved recess being formed between the fingers, and receiving the lower ring 11 therein, the former finger 29 of which extends to the outer periphery of the ring, while the latter finger 30 extends inwardly under the spokes 16, and is secured thereto by means of the bolt 31. Thus the arm moves in unison with the upper ring of the fifth wheel.

Formed on the upper ring at the rear of the axle is the reach 32, to the under side of which is bolted the bracket 33, having an arm 34 which extends downwardly and under the axle and is provided with a perforated head 35 to receive the before-mentioned bolt which passes through the spokes 16, and which forms the pivot. In the forward portion of the bracket is the recess 36 which receives the adjacent portion of the track 11, a finger 37 extending forwardly and bolted between the ring and the bolster.

While I have shown a single reach pole, it will be understood that a double reach may be used as well.

What is claimed is:

In a fifth wheel, a pair of concavo-convex rings, anti-friction rollers between the rings, one of said rings being mounted on the axle, a pair of radial spokes formed on the upper of said rings, a cross bar extending across the rear portion of said upper ring, and connected to the spokes at their intersection thereof, said bar being provided with a vertical opening at the point of juncture with the spokes, a bracket mounted below the axle, a pivot bolt passed vertically through the spokes and said bracket, a hub below the bracket and receiving the lower end of the bolt therethrough, arms connected at their inner ends to the hub, the upper ends of the arms embracing the lowermost of the rings, and being secured to said spokes, a bracket mounted on the reach, an arm on the bracket extending under the said hub and receiving the lower end of said bolt therethrough, and means on said arm for bracing and supporting the lower ring.

In testimony whereof, I affix my signature, in presence of two witnesses.

MYRON E. WAGNER.

Witnesses:
F. C. BAKER,
C. H. SNYDER.

Copies of this patent may be obtained for five cents each, by addressing the "Commissioner of Patents, Washington, D. C."